June 24, 1969 W. KROSTEWITZ 3,451,854
CONCENTRATION FUEL CELL
Filed May 25, 1964 Sheet 1 of 2
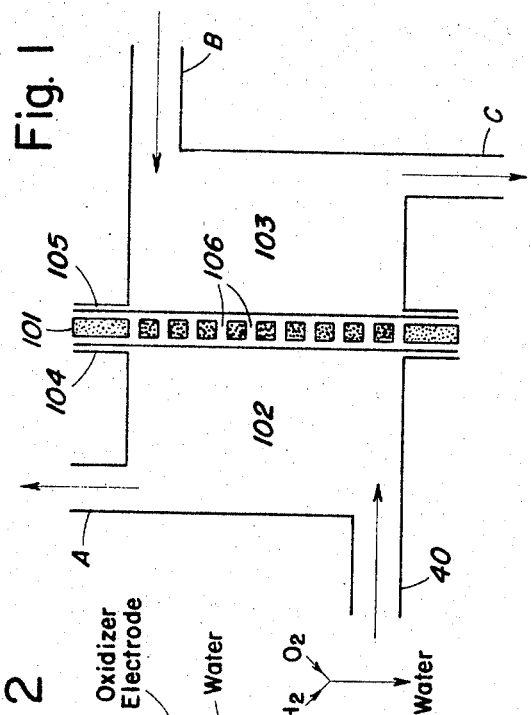
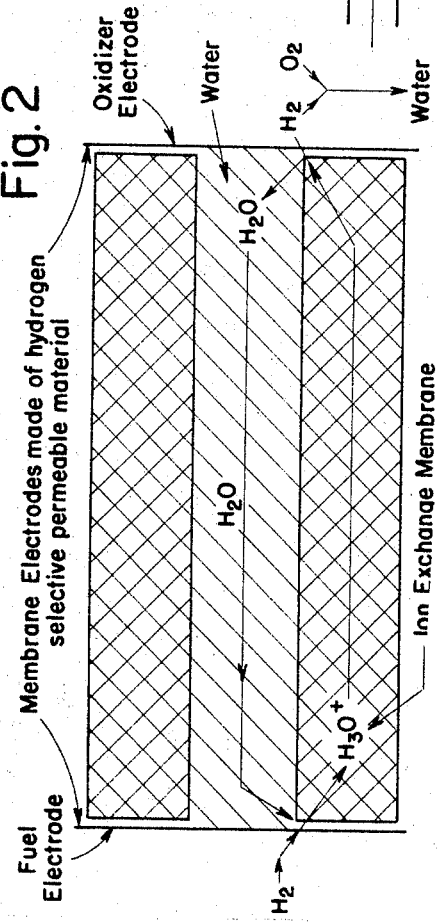
INVENTOR
Wolfgang Krostewitz
BY Eli Weiss
ATTORNEY

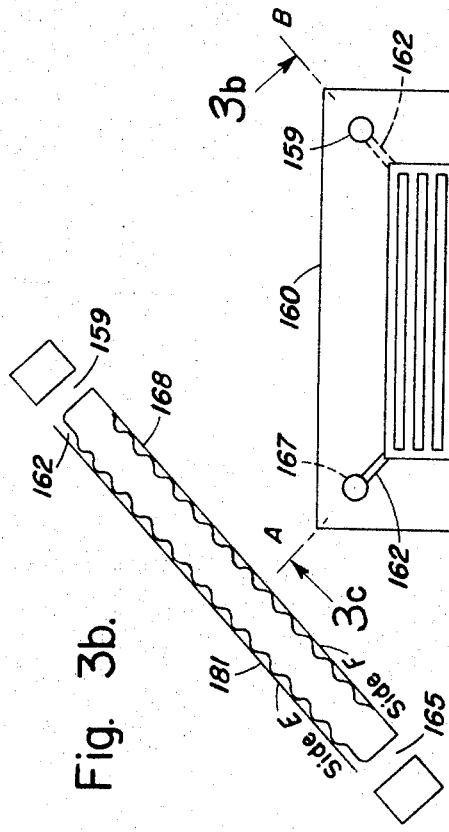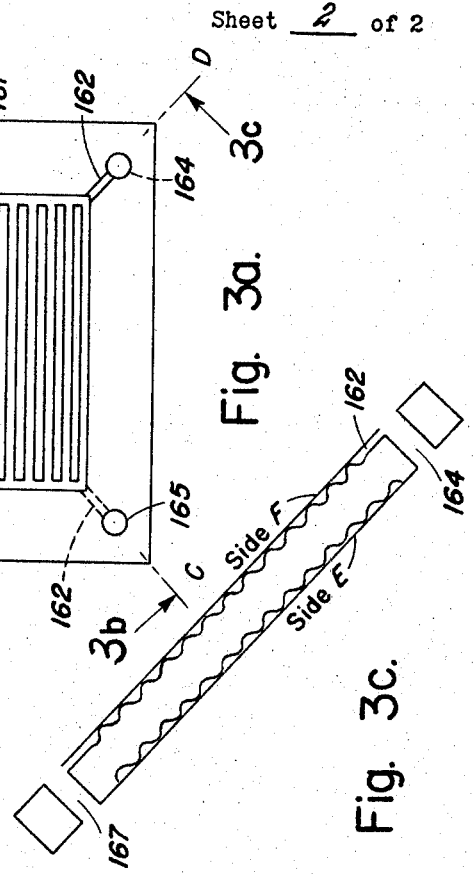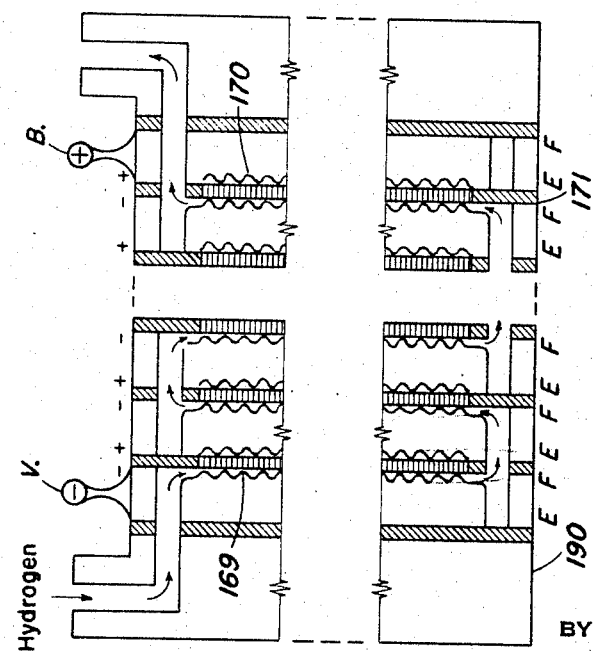

United States Patent Office 3,451,854
Patented June 24, 1969

3,451,854
CONCENTRATION FUEL CELL
Wolfgang Krostewitz, Green Brook, N.J., assignor to American Radiator & Standard Sanitary Corporation, New York, N.Y., a corporation of Delaware
Filed May 25, 1964, Ser. No. 369,754
Int. Cl. H01m 27/02
U.S. Cl. 136—86                                            1 Claim

ABSTRACT OF THE DISCLOSURE

The present invention provides a fuel cell comprising a fuel chamber and oxidizer chamber, an electrolyte chamber having electrolyte therein, the electrolyte chamber being hermetically sealed from the first two chambers by a first closed electrode separating the electrolyte chamber from the oxidizer chamber, and by a second closed electrode separating the fuel chamber from the electrolyte chamber. Each of the electrodes are composed of a material selectively permeable to only one of the cell reactants and substantially impermeable to the others, their impurities, and reaction products.

---

The invention herein disclosed relates to a novel device for the direct conversion of chemical energy to electrical energy, which device develops a voltage as a result of the difference in the concentration of one reactant in the electrodes thereof.

Although fuel cells of one sort or another have been known for over one hundred years, they have failed to find extensive use. This is the case despite the fact that their theoretical efficiency is not as limited as the efficiency of heat engines.

Up to this time, most of the fuel cells which have been studied consist of two electrodes immersed in a common electrolyte, which may be acid, neutral, or basic, solid or liquid. The reactants, the fuel and the oxidant, are externally supplied to the respective electrodes. These electrodes become charged because the reactants dissolve into the electrolyte in ionic form by taking or releasing electrons from or at the electrodes. In sequence, these ions react with each other in the electrolyte to form the reaction products.

After the electrodes have reached a certain electrical potential respective to each other, the reaction (dissolution, ionization, and the combination of ions to reaction products) stops but will continue if the electrical charge between the electrodes can balance. This may happen over an external load where the balancing current can be used to do work.

For a fuel cell of this type, the reactants must dissolve into the electrolyte in ionic form. This can only happen where reactants, electrolyte, and electrodes are in physical contact. That is to say, in points where the meniscus between the electrodes and the electrolyte is forming, or, more precisely, where a three-phase boundary exists.

To optimize current production from fuel cells, it has heretofore been thought necessary to provide the greatest possible area which can offer a three-phase boundary. To this end, a variety of porous electrodes have been suggested and tried. Although some of these porous electrodes perform reasonably well, they all have some shortcomings which are caused by their porous structure. Thus, when liquid electrolytes are used, the porous electrode structure must contain an electrolyte repellent material or must be constructed in such a way that the electrolyte will not flood the porous electrodes if an appropriate pressure difference is maintained between the reactant and the electrolyte container. This can be achieved by making these electrodes out of several layers of porous material having different pore sizes. Electrodes having both features performing still better; nevertheless, such electrodes will not perform well under vibration conditions, in high gravitational fields, or with inadequate pressure changes between electrolyte and the reactant chamber. Such electrodes are also limited in size due to the increasing hydrostatic pressure of the electrolyte which can be compensated only to a certain extent. Another shortcoming of the porous electrodes is that there are very limiting restrictions on the electrolyte. Thus the electrolyte cannot have an appreciable vapor pressure since it would evaporate into the reactant chamber where it will be carried away by the continuous flow of the reactants. Since the vapor pressure of all matter rises with temperature increase, the vapor pressure also limits the highest temperature at which porous electrodes can be used. Another important requirement on the electrolyte used with porous electrodes is that it shall not be chemically attacked, or diluted, or contaminated by the reactants, their contaminations, or the reaction products since this might and usually will change its properties to such an extent that it cannot be tolerated. Yet most of the porous body of the electrodes and its surface is not useful for the electricity-forming reaction but used only as a support for the active area inside the electrode. Since the reactants have to diffuse to this active area, contaminations or inert matter will accumulate in the pores and considerably inhibit the diffusion of the reactant to the active area. Finally, the electrolyte has to be inert and non-poisoning toward the electrode material and toward all the catalyst deposited on these electrodes. In addition, the catalysts used for the transition of the reactants between the electrodes and the electrolyte have to be stable against the respective reactants and contaminations thereof and the corresponding reaction product produced at this electrode.

The various problems above-noted which arise in fuel cell technology can all be traced back to the requirement that a large three-phase boundary be provided at the electrodes thereof where absorption, activation, and desorption or dissolution can occur which will provide the electro-chemical force. There are no known fuel cells which are not subject to this limitation.

Accordingly, one object of the invention is to provide a novel electrode in which the electricity-producing reaction takes place at electrodes which do not allow physical contact of the electrolyte with the oxidant in its natural state (liquid, gas, or solid).

Another object of this invention is to provide a fuel cell or battery in which the oxidizer electrode prohibits the direct contact of the oxidant with the electrolyte.

Another object of this invention is to provide a fuel cell in which cathode design and anode design prevents the direct physical contact of the electrolyte with the reactants.

A related object of this invention is to provide a novel fuel cell in which selectively permeable electron conductive membranes are used instead of the oxidizer electrode, or for both cathode and anode electrode.

Still another object of this invention is to provide a fuel cell in which all the reaction products are formed outside the electrolyte chamber.

A further object of this invention is to provide a fuel cell in which electrolytes can also be used with vapor pressures ranging up to the stability of the cell.

Another object of this invention is to provide a cell in which none of the reactants or their contaminants have to be inert with respect to the electrolyte.

Still another object of this invention is to provide fuel cell electrodes in which the catalysts are most efficiently positioned, so that their chemical and catalytical stability requirement toward the matter used in the cell is minimal.

These and other related objects, features, and advantages of the present invention will be more fully realized as the description thereof proceeds, particularly when taken together with the accompanying drawings wherein:

FIG. 1 is a schematic view of a fuel cell of this invention using a perforated ion-exchange membrane as electrolyte.

FIG. 2 shows a schematic view of the mechanism of the reactions taking place in the perforated ion-exchange membrane.

FIG. 3a, 3b, 3c, 3d are a series of progressive views showing the scheme for preparing and assembling of double membrane electrodes in a battery package.

Viewed broadly, the fuel cell of the present invention comprises three chambers contained in a suitable vessel. The chambers include a fuel chamber, a chamber for the oxidizing agent, and an electrolyte chamber which is hermetically sealed from the other two chambers by solid, closed electrodes. As used herein, the term "closed electrodes" is used in contradistinction to the term "porous electrodes" to signify very thin (0.001 to 0.003 inch thick) electron-conductive membranes having no visible holes and which are intrinsically permeable to a defined material but substantially impermeable to all the other materials used or produced in the cell. The selective permeability of the electrodes is caused by their internal structure or chemical composition and not by their physical structure. These electrodes physically separate the electrolyte from all reactants but one, and from the reaction products resulting from cell operation. As a result of this, it is possible to form all reaction products outside the electrolyte chamber. Therefore, neither the reaction products nor the reactants, but one, and their contaminations can react or contaminate the electrolyte, thereby maintaining constant the concentration of the electrolyte and insuring steady current production. It should be noted at this point that the inventive concept of the closed electrodes herein disclosed is not limited in its application to fuel cells containing only such electrodes, but also includes the employment of closed electrodes in association with porous electrodes as far as the reaction products are formed outside the electrolyte chamber, which would interfere with the performance of the cell.

An embodiment of a fuel cell with two electrodes and an ion-exchange membrane is shown in FIG. 1. Between the fuel electrode 104 closing the fuel chamber 102 and the oxidizer electrode 105 closing the oxidizer chamber 103 is an ion-exchange membrane 101 separating the two electrodes. The ion-exchange membrane such as sulfonated polymer, is perforated and is in close contact with the electrodes. The holes or channels 106 which provide a direct passage between the two membrane electrode junctions are filled with a suitable electrolyte such as water. The minimum number of holes or channels necessary for obtaining the advantages of a perforated ion-exchange membrane is one. The average diameter of said channel or channels ranges between $10^{-5}$ and 10 cm. In this example of the claimed cell, hydrogen selective permeable electrodes are used and the ion-exchange membrane is composed of a sulfonated polymer.

The advantage of a perforated ion-exchange membrane over a non-perforated ion-exchange membrane, used in conjunction with porous electrodes, is that the water which has been transported by the hydrogen ions through the membrane will not drain from the oxidizer electrode but will flow back to the fuel electrode through the perforation. The transport of the water is caused by the hydrogen ions moving from the fuel electrode to the oxidizer electrode whenever current is drawn from the cell. These hydrogen ions ($H^+$) move in the form of hydronium ions ($H_3O^+$), which are a combination of $H^+$ and $H_2O$ through the ion-exchange membrane. After consumption of the hydrogen ion at the oxidizer electrode, the water is released and will usually drain at the oxidizer electrode. The side of the membrane facing the fuel electrode will therefore become dry if no water is supplied to this side of the membrane which in turn will cause an intolerable polarization in the cell. By using perforated ion-exchange membranes, the water released at the oxidizer electrode does not drain, but flows back through the perforation to the fuel electrode where it is needed to prevent this polarization. The porous structure of the electrodes in conventional fuel cells makes it prohibitive to apply such perforated ion-exchange membranes since the water would drain out of the holes and thereby eliminate the necessary barrier preventing the direct reaction of the reactants.

Many other equivalent embodiments of these fuel cell systems are possible without departing from the inventive concept. Such embodiments are within the scope of one skilled in the art. The invention shall therefore not be restricted by the examples nor the illustrations used in this disclosure.

Preferred methods for preparing the electrode membranes of the invention are given below.

One conventional way of preparing suitable non-porous electrode membranes is to roll a sheet of the permeable metal to the desired thickness.

The deposition of the thin film may be achieved by electroplating, vapor phase deposition, amalgamation techniques, decomposition of metal organic compounds, and others. The backing material may be composed of for example, but without limitation, zinc, aluminum, alkali halides, actually any material which can be removed afterwards without destroying the membrane film. Thus, a flat piece of potassium bromide is formed by applying a high pressure on top of a die filled with potassium bromide. At one surface of the piece, a thin film of palladium is placed by vapor phase deposition. After dissolution of the potassium bromide, a thin membrane of palladium remains. A similar film is achieved by electroplating one side of an aluminum sheet with palladium and dissolution of the aluminunm with sodium hydroxide thereafter. In order to achieve the desired mechanical strength of these membranes, they may be fixed by suitable means to a supporting screen, porous plate, or perforated sheet, etc.

FIGS. 3a, 3b, 3c, and 3d show a complete fuel cell assembly which utilizes hydrogen as its fuel and uses double membrane electrodes. As shown in the figures, a sheet 160 of metal such as brass, iron, copper, etc. which is not permeable to the reactants is used. Channels 161 are etched or scratched into the surface of this sheet as shown in FIG. 3a. The channels 162 on Side F shown in FIG. 3b connect the openings 159 and 165 with the main channel pattern 161 in the middle on the back portion (Side E). The cavities 162 connect the holes 164 and 167 with the main channel pattern on the front (Side F). On the top of both sides of the metal sheet, thin membranes 181 and 168 are placed covering all the channels and openings, but not eliminating them. Thereafter, at each of the four corners, A, B, C, and D, openings 159, 167, 165, and 164 are drilled through the sheet. The cross section view (B–C) is shown in FIG. 3b and the cross section (A–D) is shown in FIG. 3c. These membrances 181 and 168 may just be placed on top of the non-permeable sheet and made gas-tight thereafter in the cell container 190 by pressure or may be resistance-welded to the metal sheet or other procedures may be applied as described before (vapor phase deposition, electroplating, etc.).

Such double membrane electrodes may be stacked together, as shown in FIG. 3d forming a battery. The end pieces of the battery 169 and 170 may have the cavity pattern only on one side, but also double membrane electrodes may be used while not making use of one side. Each double membrane electrode is separated from the other by a non-electron-conductive gasket such as Teflon or others. The gasket 171 is provided with two openings 172 and 173, matching the appropriate holes in the double membrane electrode. The gasket provides, at the same time, a narrow space between the double membrane electrodes which serves as a container for the necessary electrolyte. It is possible to stack these double membrane electrodes and gaskets together in such a way that the fuel streams through opening 164, through the cavities on Side F to holes 167, thence through the cavities on Side F to hole 167 of the next double membrane electrode, and so on. A similar through-pass is available for the oxygen, which passes in contradistinction to the hydrogen, through the cavities on Side E. Terminals V.B. provide the contact with end pieces of the stacked battery. This becomes evident if one looks at the cross section A–D of the package. As seen in the drawing, FIG. 3d, every other electrode is placed upside down. A battery assembled in this way will provide a voltage $(n-1)$ times the voltage of a single fuel cell of this kind, wherein $n$ is the number of metal sheets used in the cell having those channels. The advantages of this cell assembly are the following:

(1) Easy cell assembly, if desired, to high voltage packages.
(2) Better utilization of fuel and oxidizer.
(3) Battery will be rigid and compact.
(4) Mass production possible.
(5) Easy heat dissipation possible, by extending the non-permeable metal sheets to fins or passing heat exchange liquids through tubes which are provided inside the non-permeable metal sheet.
(6) The cavities can be filled with suitable catalysts.

Substantially the same results as obtained above with palladium electrodes are obtained with electrodes of platinum, iridium, rhonium, iron, nickel, cobalt, silver, titanium, zirconium, hafnium, thorium and alloys thereof in which said metals are present in a major portion.

Obviously, many modifications and variations of the present invention are possible in the light of the above teachings. It is, therefore, to be understood that within the scope of the appended claim the invention may be practiced otherwise than as specifically described.

What is claimed is:
1. A fuel cell battery consisting of a fuel chamber, an oxidizer chamber, an electrolyte chamber having electrolyte therein said electrolyte chamber being hermetically sealed from said first two chambers by a first closed electrode separating said electrolyte chamber from said oxidizer chamber, and by a second closed electrode separating said fuel chamber from said electrolyte chamber, each of said electrodes being composed of a material selectively permeable to only one of the cell reactants and substantially impermeable to the others, their impurities, and reaction products, each of said chambers comprising a sheet of a separator material able to conduct an electronic current from the front to the back of said sheet and substantially impermeable to the reactants, inlet and outlet openings in said separator for the individual entry and exit of each of the cell reactants, channels provided on the front and back surfaces of said separator for feeding said reactants to the chamber, electron conductive selectively permeable membranes secured to each side of said separator providing the outer walls of the channels with openings for the separate passage of the reagents into and out of the channels, each of said chambers being spaced apart by at least one non-conductive gasket having openings for the separated passage of the reagents from the outlet openings of one chamber to the inlet openings of the succeeding chambers and an opening for the electrolyte positioned between said chambers and the gasket.

References Cited

UNITED STATES PATENTS

| | | | |
|---|---|---|---|
| 359,934 | 3/1887 | Main | 136—86 |
| 3,092,517 | 6/1963 | Oswin | 136—86 |
| 3,110,631 | 11/1963 | Carlton | 136—86 |
| 3,180,762 | 4/1965 | Oswin | 136—86 |
| 3,188,242 | 6/1965 | Kordesch et al. | 136—86 |
| 3,206,332 | 9/1965 | Juda | 136—86 |
| 3,216,882 | 11/1965 | Feldt et al. | 136—86 X |
| 3,236,692 | 2/1966 | Lewis | 136—86 |
| 3,278,336 | 10/1966 | Uline et al. | 136—86 |

FOREIGN PATENTS 1,299,346  6/1962  France.

ALLEN B. CURTIS, *Primary Examiner.*